Nov. 4, 1930.  A. JACKSON  1,780,192
DEFLECTING RIM FOR BOILERS AND WASHING MACHINES
Filed Feb. 7, 1928   2 Sheets-Sheet 1
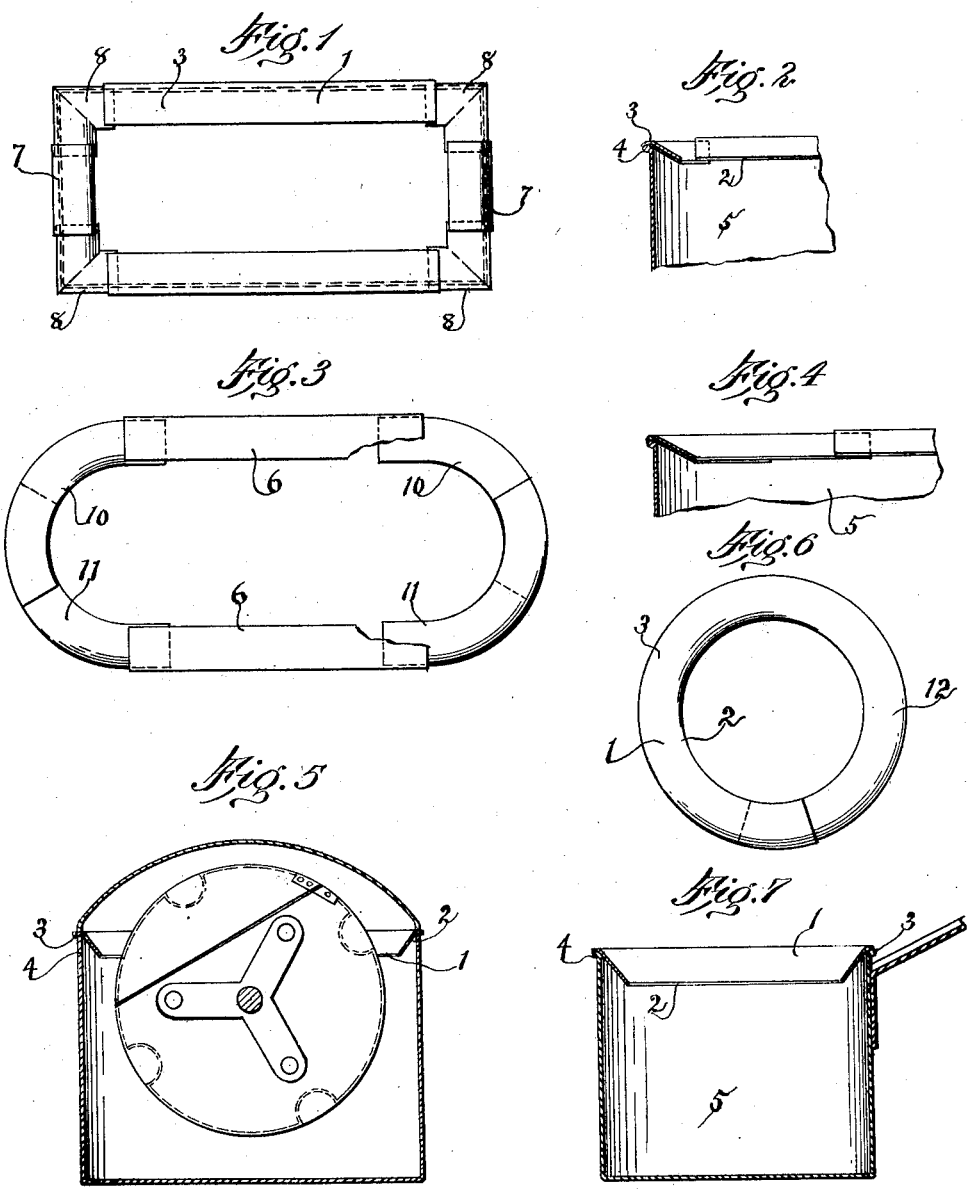
Inventor
Andrew Jackson
By Attorney
F. N. Gillett Nov. 4, 1930.  A. JACKSON  1,780,192
DEFLECTING RIM FOR BOILERS AND WASHING MACHINES
Filed Feb. 7, 1928  2 Sheets-Sheet 2
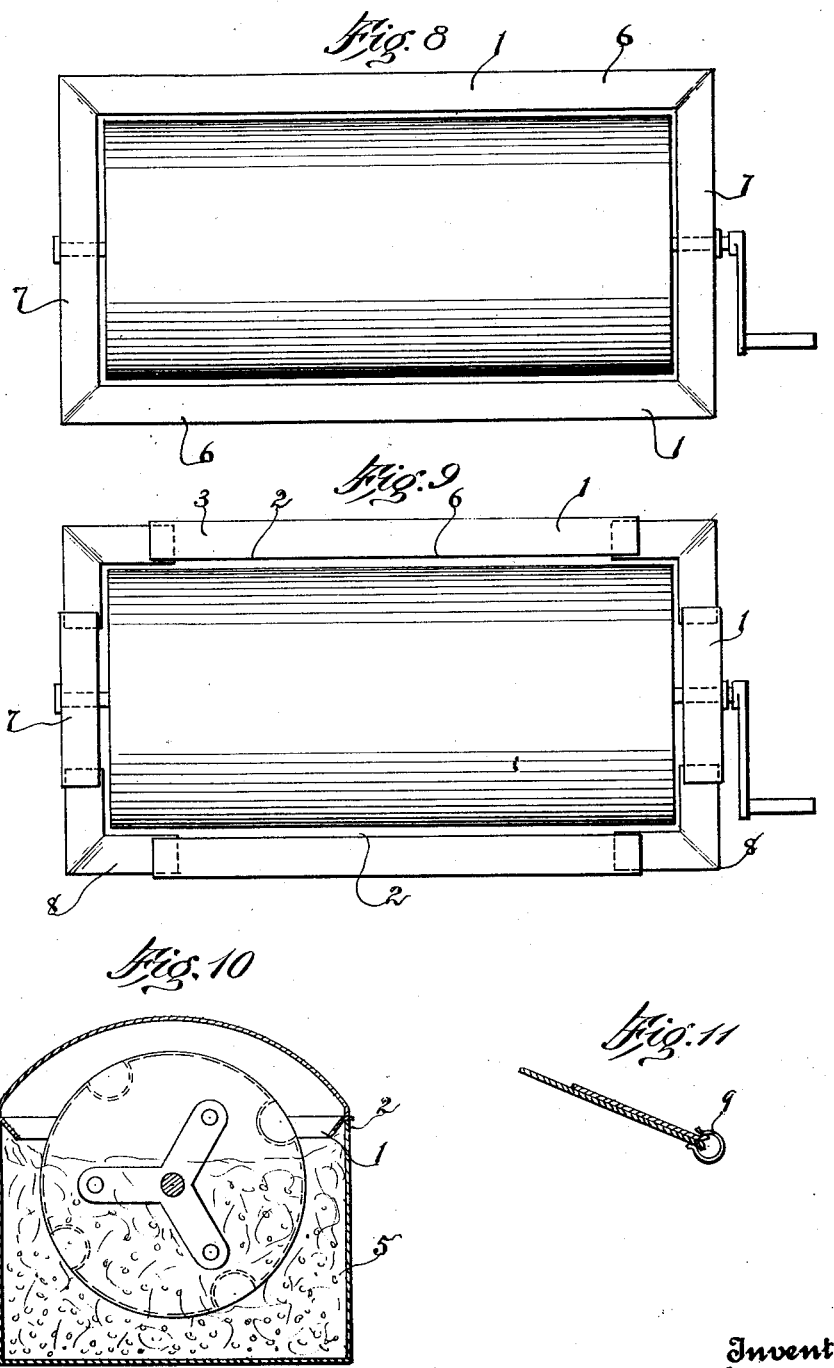

Patented Nov. 4, 1930

1,780,192

UNITED STATES PATENT OFFICE

ANDREW JACKSON, OF BINGHAMTON, NEW YORK, ASSIGNOR OF ONE-HALF TO F. A. HAIGHT, OF JOHNSON CITY, NEW YORK

DEFLECTING RIM FOR BOILERS AND WASHING MACHINES

Application filed February 7, 1928. Serial No. 252,653.

My invention relates to improvements in deflecting rims or flanges applicable to vessels in which ebullition takes place.

It is broadly applicable and may be used on washing machines, wash boilers, cooking utensils or other portable vessels in which water or other liquid is boiled.

It has for its object to prevent what is commonly called "boiling over" of the liquid in the vessel. In all vessels in which liquids are boiled it will be found that great loss often occurs and considerable damage is done to surrounding objects if the liquid boils over. Even in vessels having non-steam-tight covers the liquid over-boiling seeps through the opening between cover and vessel with deleterious results as outlined above.

To obtain the object of my invention, I make use of a novel deflector, which may be adjustable or may be removable within the scope of this invention, or it may be permanently fixed to the vessel to which it is applied, having particular reference to its application to the body portion of washing machines.

With the above and other objects in view, my invention consists of the following novel features of construction and arrangement of parts as will be hereinafter more particularly described and pointed out in the claim. Reference being had to the accompanying drawings, in which Fig. 1 is a plan view of one form of my device, adjustably mounted in a more or less rectangular vessel.

Fig. 2 is a sectional elevation of a part of the adjustable form of my device shown in Fig. 1.

Fig. 3 is a plan view of one form of my device, adjustably mounted in a vessel having parallel sides and rounded ends, such as, for instance, a well-known wash boiler.

Fig. 4 is a sectional elevation of a portion of the form of my device, shown in Fig. 3.

Fig. 5 is a sectional end elevation of one type of washing machine having my invention in its solid, non-adjustable form, mounted therein.

Fig. 6 is a plan view of a form of my invention adjustably mountable in a cooking vessel having a circular top.

Fig. 7 is a sectional elevation of a cooking vessel with the form of my device shown in Fig. 6, mounted therein.

Fig. 8 is a plan view of a well known type of washing machine having the non-adjustable but removable form of my invention mounted therein.

Fig. 9 is a plan view of a well known type of washing machine having the adjustable form of my invention mounted therein.

Fig. 10 is a sectional end elevation similar to Fig. 5 indicating the movement of the liquid during ebullition when my device is used.

Fig. 11 is an enlarged section of the clip used to hold the component parts of the adjustable deflector together.

In carrying out my invention, I provide a deflector body 1, made to conform as regards size to the opening in the top of the vessel to which it is to be applied. This deflector regardless of details as to size, exact shape, etc., has a generally inwardly and downwardly extending form, causing its inner edge 2 to be smaller and on a lower horizontal plane than its outer and higher edge 3. This outer edge 3 is made to conform to the size and shape of the top rim 4 of the vessel 5. Most vessels of the kind under consideration have a rolled or turned rim which provides a rounded surface upon which the deflector rests. If it is desired to remove the deflector for the purposes of more readily cleansing the vessel, it is simply lifted therefrom, and replaced when it is again desired to use the vessel for boiling. In its application to a washing machine, it may not be desired to boil the liquid while the washing is being done in which case the deflector prevents the liquid or suds from being thrown too high against the walls of the vessel and its subsequent seeping out through the small opening between the cover and the top of the rim of the vessel.

For the adjustable form of my invention, I provide interlocking, slidably, engaging sections of such individual form as will, when assembled, form a complete, adjustable deflecting plate capable of mounting in vessels of the same general upper rim conformation but of varying size. For a rectangular vessel, I provide a series of engaging shaped plates as shown in Fig. 1, which consists of parallel side plates 6, parallel end plates 7, and shaped corner plates 8. When it is desired that this adjustable form of my invention be removable, clips 9, (Fig. 11) are provided which hold the deflector plates in close but slidable relation to each other. In the form of my invention applied to vessels of parallel sides with rounded ends as in Fig. 3, I provide parallel side plates 6, and curved end plates 10 and 11 which engage each other in a manner similar to the form for rectangular vessels deflector plate 12, somewhat longer than its internal and external circumferences would demand, which causes the ends to over-lap. Resiliently binding together these ends are clips 9, (Fig. 11), which permits the end to be moved with relation to each other within certain limits, thus making the circumferences of the circular rim 12 consequently smaller or larger to accommodate somewhat different size vessels.

In case it is desired to permanently fix the deflector to a vessel, clips 9 may be dispensed with and either a solid deflector plate 7, of proper size fixed to the vessel rim, or the adjustable plates fastened together permanently, then the complete deflector soldered or otherwise fastened to the vessel rim. It would be of advantage to certain manufactures of cooking utensils of various sizes to have on hand competent plates for making up adjustable deflectors to be soldered together or otherwise permanently fixed to there vessels, thus being able to fit their various utensil sizes without the expense of having separate dies, made for stamping out one piece deflectors in small quantities.

In the operation of my device, in mounting the deflector in the rectangular opening of the boiler body, I adjust the corner pieces 8—8 with the adjoining end sections 7 and side sections 6 and by moving the sections inwardly and outwardly in engagement, I conform the sizes of the deflector 1 to fit the opening in the boiler body. In the circular end formation of my device the parts are placed in engagement as before described, and then by sliding the parts, the size of the device may be adjusted as to width and length of the boiler, and to fit the opening in the boiler structure completely. In a vessel having a round opening as a pot, the ring deflector 12 by its open ends become somewhat resilient; subject to compression and expansion and may be sprung into place within the rim of the vessel, the sliding engagement of the ends permitting of a compression of the device, which by means of clips 9 is held in shape and remains in place within the vessel ready to be removed when not in use.

Having thus described my invention what I claim as new and for which I desire Letters Patent is as follows:

In a deflector for vessels and the like, opposing side plates and opposing end plates fitted together to form a complete detachable rim for resting upon the edge of a vessel, the inner edges of the said plates being disposed below their outer edges, said plates extending inward and downward from the upper edge of the vessel.

In testimony whereof I have affixed my signature.

ANDREW JACKSON.